United States Patent [19]
Pollock

[11] 4,010,929
[45] Mar. 8, 1977

[54] VALVE

[75] Inventor: James J. Pollock, Midland, Mich.

[73] Assignee: The Dow Chemical Company, Midland, Mich.

[22] Filed: May 31, 1973

[21] Appl. No.: 365,651

Related U.S. Application Data

[63] Continuation-in-part of Ser. No. 271,375, July 13, 1972, abandoned.

[52] U.S. Cl. ................................ 251/260; 251/368
[51] Int. Cl.² ........................................ F16K 31/52
[58] Field of Search .......... 251/251, 257, 260, 261, 251/334, 36 P

[56] References Cited
UNITED STATES PATENTS

| | | |
|---|---|---|
| 430,712 | 6/1890 | Vanderman ...................... 251/260 |
| 982,981 | 1/1911 | Mueller ............................. 251/260 |
| 1,006,012 | 10/1911 | Skjelstad ......................... 251/261 |
| 3,057,370 | 10/1962 | Hamilton ...................... 251/368 X |
| 3,064,941 | 11/1962 | Stromberg ........................ 251/260 |
| 3,093,359 | 6/1963 | DeWoody ..................... 251/368 X |
| 3,623,697 | 11/1971 | Austin ............................... 251/261 |
| 3,669,407 | 6/1972 | Mundt et al. ..................... 251/334 |

*Primary Examiner*—Martin P. Schwadron
*Attorney, Agent, or Firm*—Robert B. Ingraham

[57] ABSTRACT

A crank-operated valve is provided wherein the valving member and stem are of deflectable plastic material. Such an arrangement permits a corrosion resistant, easily operating valve to be prepared using an imprecise valve body.

6 Claims, 3 Drawing Figures

VALVE

This application is a continuation-in-part of my copending application Ser. No. 271,375, filed July 13, 1972, now abandoned.

Many valves are known and employed for the control of liquid and gas flow. Most of such valves must have a relatively precise or precision construction to permit seating. Many valves, with the notable exception of pinch valves and diaphragm valves, often present problems when used with slurries of solids in liquids. Corrosion resistant piping has become increasingly popular. Such corrosion resistant piping includes glass pipe, glass lined pipe, plastic pipe of both thermoplastic and thermosetting varieties. A substantial problem in many applications for piping is providing a valve which is simple, reliable and can be prepared at low cost. The initial cost of valves as well as valving repair and replacement has presented a significant economic burden on the user of corrosion resistant piping.

It would be desirable if there were available an improved flow control valve which did not require a high degree of precision.

It would also be desirable if there were available a valve in which the seating force was adjustable.

It would further be desirable if there were available an improved valve employing corrosion resistant components which can employ a valve body of relatively low precision.

These benefits and other advantages in accordance with the present invention are achieved in a valve comprising a hollow body defining a cavity therein, the body defining at least three openings, the three openings defining an inlet opening, an exit opening and a valving opening, the seating region having a generally circular configuration and an axis disposed generally perpendicular to an axis of the valving opening, a crank member rotatably and sealably supported within the valving opening, the crank member having an exterior end exterior to the cavity and an interior end in at least close proximity to the sealing opening, the crank member having an axis of rotation generally normal to and generally intersecting the axis of the inlet opening, the interior end of the crank member being eccentrically disposed relative to the axis of the crank member, a valving member adapted to be selectively positioned in sealing engagement with the seating region connected to said eccentric, the eccentric and the seating member being resiliently supported within the valve body.

Further features and advantages of the present invention will become more apparent from the following specification taken in connection with the drawing wherein.

Figure 1:
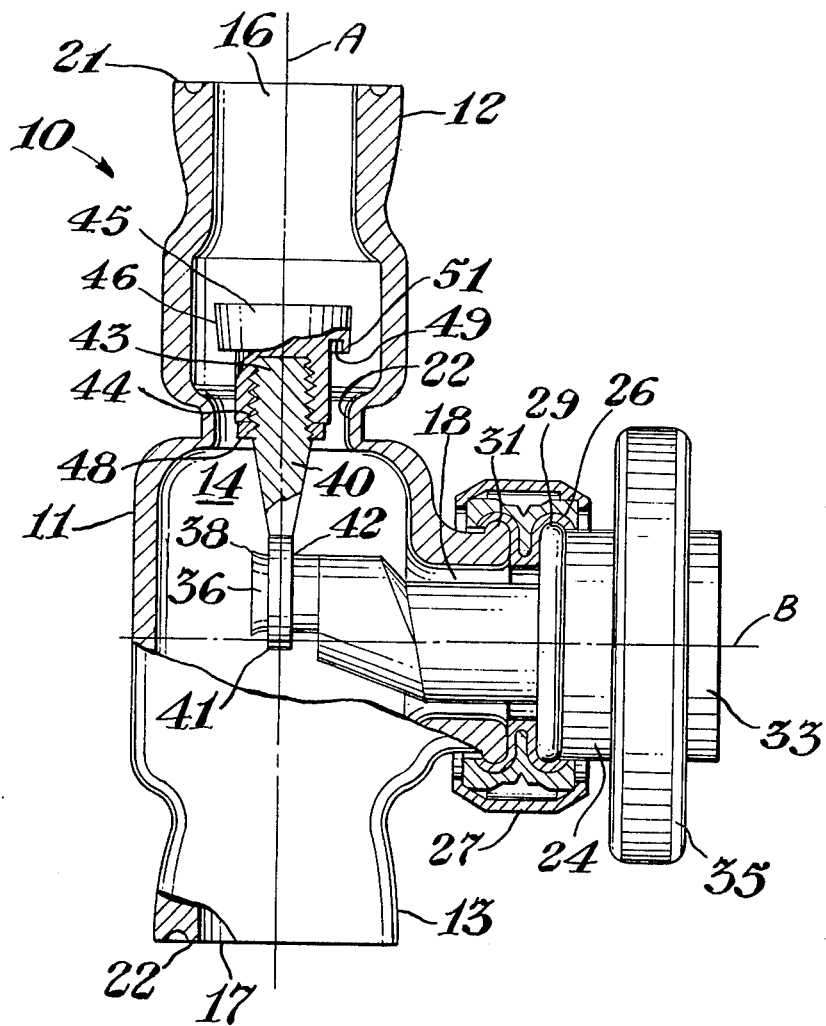
FIG. 1 is a schematic sectional view of a valve in accordance with the present invention.

In FIG. 1 there is schematically depicted a sectional view of a valve in accordance with the present invention generally designated by the reference numeral 10. The valve 10 comprises in cooperative combination a housing or body 11 having a first end 12 and a second end 13. The body 11 is hollow and defines therein a cavity 14 and an inlet opening 16, a first discharge opening 17 and a valving opening 18. The openings 16, 17 and 18 are all interconnected by the cavity 14. At the ends 12 and 13 are connecting means or flanges 21 and 22 of conventional construction. The body 11 defines within the cavity 14 a generally annular seating region 22 adapted to mate with an operating face of a valving member. The seating region 22 has an axis of generation generally designated by the reference character A. A valve actuating member or crank 24 is disposed within the opening 18 of the body 11. The crank 24 is rotatably and sealably supported by means of a resiliently backed seal member 26 which in turn is maintained in position by means of suitable retaining means such as a split ring clamp 27. The seal member 26 engages a first annular proturberance 29 formed on the crank 24 and a second generally similar proturberance 31 formed on the body 11 about the valving opening 18. The crank 24 has a first or external end 33 in operative engagement with an actuating means or handle 35. Remote from the handle 35 is an eccentric portion 36 of the crank 24 disposed within the cavity 14 and lying generally adjacent the axis A. The crank 24 is supported by the seal 26 in a manner to permit rotation about the axis B lying generally normal to the axis A. The eccentric 36 terminates remote from the end 33 in a retaining means or ridge 38. An operating shaft or connecting rod 40 having a first end 41 which defines an opening 42 rotatably receives the eccentric 36. The connecting rod 40 has a second end 43 remote from the eccentric 36 and defines a plurality of threads of adjustable connecting means 44 thereon. A closure member 45 is adjustably supported on the second end 43 of the connecting rod 46 and is maintained in position thereon by means of a locknut also threadably supported on the second end 43 of the connecting rod 40. The closure member 45 defines thereon an annular sealing face 46 adapted to engage the seating region 22 and provide a desired liquid-tight seal. The sealing member 45 defines a generally annular recess 49 at a location generally adjacent the face 46 and the seating region 22 to provide a readily deflectable lip portion 51.

Figure 2:
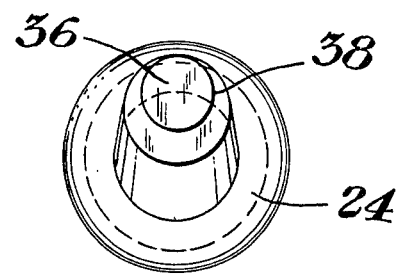
FIG. 2 is an end view of the actuating member of FIG. 1.

In FIG. 2 there is depicted an end view of the actuating member 24 showing the eccentric 36 and the enlarged retaining portion 38.

In operation of the invention as depicted in FIGS. 1 and 2, the crank 24 is readily rotated by means of a handle 35. The eccentric 36 is caused to move away from or toward the seating area 22 as the crank 24 rotates about the axis B. The rotary action of the crank 24 causes the connecting rod 40 to selectively position the sealing means 45 and cause the sealing surface 46 to engage or disengage the seating region 22. By resiliently supporting the eccentric 36 and/or providing an actuating means which is deflectable, adjustment of the position of the closure 45 on the connecting rod 40 permits ready control within reasonable limits of the seating force exerted by the stem or actuating means 24. Thus, by appropriate selection of materials for the particular application, such a valve will tolerate solids between the face 46 and the seating arrangement 22 without damage. If the valve on closing entraps solids, it may be readily loosened by the wiping action of the valving member and the solids flushed away. Beneficially, the arrangement as depicted in FIGs. 1 and 2 permits the preparation of valves using relatively nonuniform valve bodies. If the seating region is a greater or lesser distance from the axis B this can be readily compensated for by adjustment of the seating member 46 or by deflection of the shaft or crank member 24.

Such latitude is particularly desirable in valves having glass bodies, ceramic bodies, plastic lined valve bodies as well as metal bodies.

Figure 3:
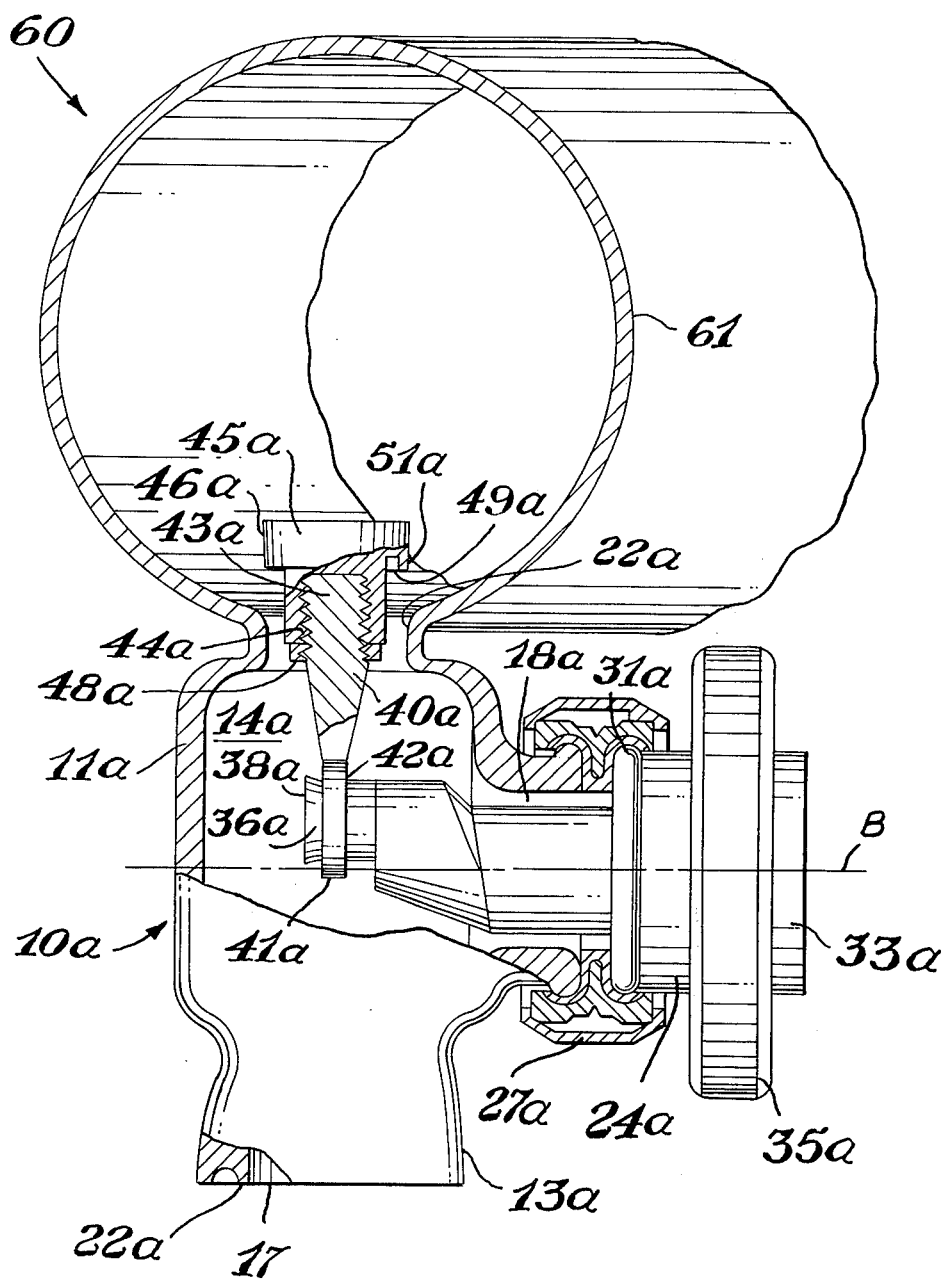
FIG. 3 is a view of an alternate embodiment of the invention.

In FIG. 3 there is depicted a partly in-section view of an alternate embodiment of a valve of the invention designated by the reference numeral 60. The valve 60 comprises a conduit 61 having affixed thereto a valving arrangement 10a. The arrangement 10a corresponds to the valve 10 of FIG. 1 and corresponding parts are indicated by reference numerals having the suffix "a". The valve 60 has a generally T-shaped configuration and the valving arrangement 10a provides a selective communication between space within the conduit 61 and a first exit opening 17a.

The valve 60 is employed with particular benefit as a sampling valve wherein a process stream is passed through an inlet opening of the conduit 61, discharged from an outlet or exit opening therein and sampled by opening the valve as shown in FIG. 3. In the closed position, the closure member 45a is generally flush with the inner conduit wall and offers no significant hinderance to flow of a process stream. A minimum of "dead space" exists. Therefore, representative stream samples can be obtained by withdrawing relatively small quantities of the process stream. The valve 60 is employed with particular benefit for sampling process streams which contain particulate solids, as valve "dead space" in which such solids can accumulate is minimal.

A wide variety of plastics are suitable for the preparation of valves in accordance with the present invention. The selection of such plastics includes polytetrafluoroethylene, polytrichlorofluoroethylene, nylon 66, nylon 6, nylon 11, polypropylene, polyethers such as those commercially available under the trade name of "Penton," polycarbonates and the like. The selection of the particular plastic material will depend generally on the type of service required by the valve. For general applications, polytetrafluoroethylene is usually satisfactory. From a standpoint of deflectability, plastics are readily selected for use in the present invention by supporting a ½ inch diameter rod with 12 inches of the rod extending beyond the support. If the free end of the rod can be deflected one inch without fracture of the rod, the plastic material is satisfactory. It is not essential that all of the valving mechanism be prepared from the same plastic material, although from a standpoint of corrosion resistance usually it is desirable. No degree of resilience is required in the connecting rod 40. Therefore, if desired, the connecting rod 40 and retaining means 44 can be prepared from a material such as stainless steel or the like. Generally, however, all plastic components are preferred. Alternately, the sealing or seating face 46, if desired, may have one or more O-rings disposed in annular grooves formed therein to facilitate sealing. However, for use with liquids containing solids, it is generally desirable to employ a face such as the face 46 of FIG. 1.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:
1. A valve comprising
   a hollow body defining
   a cavity therein, the body defining at least three openings, three of the openings being
   an inlet opening,
   a first exit opening and
   a valving opening between the inlet opening and the first exit opening,
   a seating region within the cavity having a generally circular configuration and
   an axis disposed generally perpendicular to the axis of the valving opening,
   a crank member rotatably and sealably supported within the valving opening, the crank member having
   an exterior end exterior to the cavity and
   an interior end in at least close proximity to the seating region, the crank member having
   an axis of rotation generally normal to and generally intersecting the axis of the inlet opening, the interior end of the crank member being eccentrically disposed relative to the axis of the crank member,
   a valving member connected to the interior end of the crank member, the valving member adapted to be selectively positioned in sealing engagement with the seating region by rotation of the crank member, and means to resiliently support the interior end and the valving member within the valve body with the further limitation that the crank member and the valving member are plastic.
2. The valve of claim 1 wherein the body is glass.
3. The valve of claim 1 wherein the valving member has a generally annular sealing face and a deflectable lip portion disposed generally adjacent the sealing region of the body.
4. The valve of claim 1 wherein the crank member and valving member are polytetrafluoroethylene.
5. The valve of claim 1 in operative combination with a conduit.
6. The valve of claim 1 including an adjustable connecting means disposed between the valving member and the interior end.

* * * * *